United States Patent [19]

Hall

[11] Patent Number: 5,611,035
[45] Date of Patent: Mar. 11, 1997

[54] RELATIONAL DATA BASE SYSTEM FOR CONVENIENTLY CONSTRUCTING GRAPHICAL IMAGES

[75] Inventor: Kevin W. Hall, Highland, N.Y.

[73] Assignee: International Business Machines Corporation, Armonk, N.Y.

[21] Appl. No.: 961,749

[22] Filed: Oct. 16, 1992

[51] Int. Cl.⁶ .................................................. G06T 11/00
[52] U.S. Cl. ........................................ 395/140; 395/613
[58] Field of Search ............................ 395/133, 135, 395/139, 140–143, 145, 147, 155, 161, 600; 364/DIG. 1

[56] References Cited

U.S. PATENT DOCUMENTS

| | | | |
|---|---|---|---|
| 4,674,042 | 6/1987 | Hernandez et al. | 395/140 X |
| 5,075,843 | 12/1991 | Selzer | 395/500 |
| 5,201,046 | 4/1993 | Goldberg et al. | 364/DIG. 1 |
| 5,313,571 | 5/1994 | Hirose et al. | 395/140 |

*Primary Examiner*—Almis R. Jankus
*Attorney, Agent, or Firm*—Lawrence D. Cutter

[57] ABSTRACT

Relational data base concepts are employed to establish many-to-many relationships amongst components which are ultimately used to supply position and size information for elements appearing in a graphical data structure. This method also facilitates the management of the production of sets of graphical business charts and/or other graphical information including architectural plans, other real world models, and even three-dimensional graphic components. A method for implicit association is established so that components are not manually related to one another, but rather by interpretation of relational data contained in a set of tables. Accordingly, a method is provided to reduce redundant specification, storage and effort usually found in business tools and applications that automate the production of business charts.

9 Claims, 3 Drawing Sheets

RELATIONAL DATA BASE SYSTEM FOR CONVENIENTLY CONSTRUCTING GRAPHICAL IMAGES

BACKGROUND OF THE INVENTION

The present invention is generally directed to computer graphics systems. More particularly, the present invention is directed to a system in which graphic elements are assembled in a multitude of fashions in dependence upon list structures. The present invention is particularly applicable to the automatic generation of business graphics images. However, the concepts employed herein may in fact be extended to other two-dimensional and three-dimensional computer graphics applications. More succinctly, the present invention provides a method for the generic and implicit storage and reassembly of graphical elements, especially chart components.

The motivation for the present invention arises from the field of business graphics, and more particularly from the computer aided generation of business graphics images both on screen and in printed form. However, the principles employed in the design of the present invention are extendable to other graphical applications including both two-dimensional and three-dimensional architectural design and image generation. Nonetheless, the thrust of the present description is based on the business graphics application which provided the original motivation for the invention. In particular, it is seen that the invention provides a method for managing the production of sets of graphical business charts and other related graphical information. Moreover, it is seen that the invention provides what is in effect a chart representation language (CRL).

In the present business climate there are an increasing number of occasions for which the presentation of measured and collected information is important. Moreover, it is important to be able to present these measurements in a systematic form which is readily able to be perceived and communicated. Visual or graphical information has been found to be particularly useful for such purposes. This current emphasis is evidenced by numerous computer related products which provide not only data base and/or spread sheet functionality but which also provide a means for representing selected pieces of information in a systematic and organized fashion.

However, when the data involves different source variables and different categorizations over various periods of time and with a wide variety of relational options, the number of specifically tailored graphical output structures becomes very large. When various combinations of relations as specified by a large number of different criteria are considered, the generation and management of the graphical output becomes very difficult.

One of the inventive aspects of the present invention is that it has been recognized that a business graphic chart can in fact be broken down into a number of different substructures. For example, a typical substructure might include a vertical bar and this vertical bar may or may not be cross-hatched in a particular way to indicate its association with other elements of the graph. Likewise, the size of the bar has been recognized as being controllable by a magnitude value and correspondingly, it is has been appreciated that there are certain attributes that the bar possesses in terms of its relative positioning with respect to other bars and the X and Y coordinate axes. Moreover, it has been appreciated that the coordinate axes themselves may be treated as independent components as long as they can be specified and reconstructed in an appropriate way in an output graphical image. Furthermore, it has been appreciated by the present inventor that the size and relative positioning of these graphical elements may be defined via relational data base concepts. Correspondingly, it has also been appreciated that the concepts concerning the relational data base aspects of the invention provide a mechanism for specifying what is in fact a chart representation language. Thus through very simple user interface mechanisms it is possible for decision makers and those who support them to readily generate selected information representations in the most useful form and format.

The approach of the invention is thus in contrast with other decision support tools which are presently available but which are inadequate to meet chart automation needs when it comes to the maintenance of a large number of regularly produced charts. Typical solutions to this chart maintenance problem have involved either programming or some form of duplicative maintenance effort. A principal reason for this inadequacy is that many of these chart construction technologies are designed for interactive use rather than for the batch production of business graphic charts. For example, when using one program, referred to as the Interactive Chart Utility (ICU) to make charts manually, components from a file which describes the format of the chart cannot be chosen selectively. This format is applied to an entire chart, and if two charts had one component which was different, either a new form or additional manual effort to change the form would be required. When generating charts using the Application System (AS) program, maintenance programming is usually required when chart requirements change. In addition, specifying a requirement or chart component that applies to a group of charts cannot be done easily. In another program called GDDM/PGF, specific lower level programming is required for chart generation where requirements change after installation of an application. These usually require changes in the application code. This is an unacceptable and now unnecessary activity. Additionally, using the query management facility (QMF) with ICU for a specific application to make charts automatically also requires structured query language (SQL) and procedure (PROC) maintenance when requirements change. It is thus seen that the advanced tools which are currently available do not meet the needs of a user whose job is to generate and manage a large number of different sets of business graphics, especially when the information represented by the graphical output represents magnitude values associated with a number of different variables.

Even using a very flexible and powerful tool like the data interpretation system (DIS) program can produce a large number of charts by copying objects used to create the charts for each chart and by modifying the aspects that are particular to a given chart. When an aspect that is similar for a group of charts changes, the effort to change that aspect is duplicated for each object. Some engineering graphics tools also represent and select individual components of "charts". However, components are usually related to something other than business related attributes such as trends, hierarchical organizations, axes, chart notes and business graphic types. Finally, most of today's other chart creation tools (like APGS) and specific business graphic applications are designed for the interactive user rather than for automated, management-by-fact facilities. When many charts are being produced automatically, there is usually a great deal of overhead associated with specifying the requirements for the charts, and much of this overhead is extremely duplicative.

SUMMARY OF THE INVENTION

In accordance with the present invention a method is provided for generating multiple component graphical data structures. More particularly, the method provides for the generation of multiple data structures each of which exhibits multiple components. Furthermore, the method of the present invention insures a consistent and automated means for the generation and display of graphical data structures through the utilization of relational data base concepts.

More particularly, the present invention provides a method for generating multiple component graphical data structures by means of a sequence of steps. The first step involves specifying a graphical data structure (GDS) element and a GDS description associated with said GDS element, thus establishing a GDS list. The next step of the invention involves specifying at least one magnitude value and at least one component description which is associated with the magnitude value, and which is also associated with a GDS description which is also associated with the magnitude value. The step establishes an indicia list. The next step involves the specification of at least one GDS description template which is associated with a component description and which is also associated with relative position indicia, thus establishing a component list. Finally, for each GDS description entry in the GDS list, a GDS is generated which includes at least one GDS element associated with the description entry, the GDS element being associated with one of said magnitude values as specified in said indicia list, said GDS element also being associated with relative position indicia from said component list. Except for the last process step indicated above, the above mentioned specification steps may be carried out in any convenient order.

In the present invention, the graphical data structures are produced by comparison operations which are implicitly specified in the information supplied by the user. In particular, the method of the present invention permits the use of templates which are useful in the establishment of relationships between elements in the specified lists. More particularly, templates refer to fields that may contain wild cards or masks each of which may contain any single character or multiple characters. When comparing descriptions, these wild cards are taken into account, thereby enabling many-to-many relationships with minimal elements in each list. It is in this sense that the word template is employed in the present invention. Likewise, the expression "graphical data structure" is meant to refer to a related set of specifications for a graphical image which is made up of several independent elements which do not typically overlap one another. In the present invention, such elements may be expressed in any number of either raster based or vector formats. Similarly, it is understood that any number of correspondingly conforming graphical display engines and their associated software packages would be capable of accepting lists of graphical data structure elements and generating therefrom a visual image to be either printed or displayed. Typically, such graphical engines include digital computers running appropriate software. A typical example of such a graphical engine standard might include the postscript page description language and associated means for displaying same such as the Display Postscript tool.

Accordingly, it is an object of the present invention to provide a method for managing the automated production of business graphic chart sets.

It is also an object of the present invention to automate the production of business graphic charts.

It is yet another object of the present invention to provide a means for readily specifying chart information by means of a chart representation language.

It is a still further object of the present invention to produce graphical data structures comprising lists of graphical data structure elements using a plurality of basic forms whose magnitude and relative position are specified by means of comparison operations carried out on lists of specifications based upon several many-to-many relationships.

It is a further object of the present invention to provide a front end or chart representation language for the purpose of facilitating the generation and display of business graphics and other graphical information.

It is also an object of the present invention to provide a mechanism for the automated assembly of two-dimensional and three-dimensional graphical elements based upon specified many-to-many relationships.

It is an additional object of the present invention to provide a mechanism for assembling together two and three-dimensional representations of graphical structures in accordance with prior specified lists which reflect many-to-many relationships between component parts, particularly with respect to position and size.

Lastly, but not limited hereto, it is an object of the present invention to provide a chart representation language.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
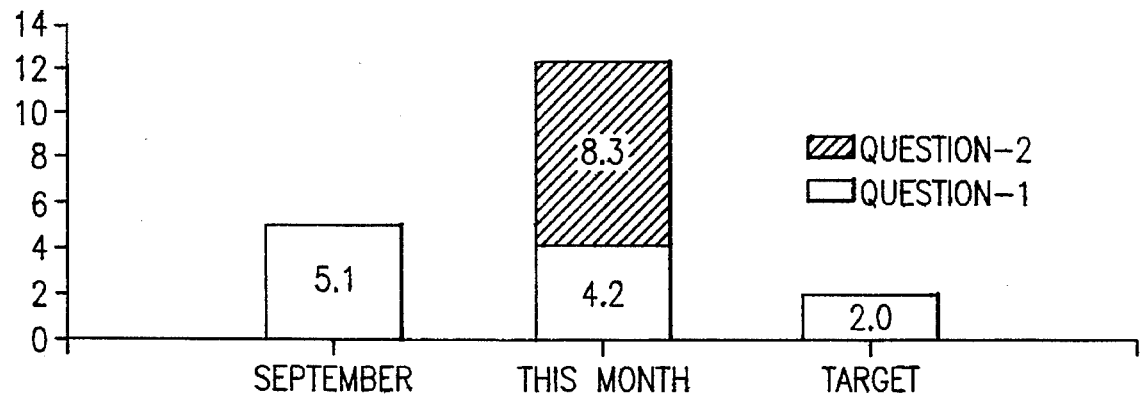
FIG. 1 is a typical business chart produced in accordance with the present invention.

In accordance with a preferred embodiment of the present invention, a method for managing the automated production of business graphic chart sets employs a chart representation language (CRL) which has been developed to meet the needs described above so that flexible automation can be easily maintained. A description of the CRL is contained in Appendix A below.

When a set of charts exhibits a common entity, the CRL provides a mechanism to describe attributes that make those charts similar and to describe components that should be constructed and placed on each of the charts. The present method uses general, application independent methods and reduces the duplication of effort commonly associated with applications and most kinds of existing chart generation facilities. The importance and utility of the present method increases with the number of charts being produced that have something in common. The resulting benefit is the minimal input required to maintain a large set of charts. An example fully describing the operation of the present invention is provided below.

In order to reduce the overhead required with other facilities, a method called "pattern matching" is used. Pattern matching recognize similarities between patterns and objects or events. This enables summary data to be selected and positioned under various conditions. This data is stored with the widest possible set of "data attribute" fields and is stored with attribute values independent of the conditions under which it is selected and positioned on the chart. Pattern matching is used in the CRL to predefine possible common pattern types in source data with possible fields to match so as to determine when to include a "component". These fields provide a mechanism for the components to describe the data, system and chart conditions under which they are applied. When the patterns the user has specified in a particular row of a Table matches the attributes of the summary data, the action associated with other values in that row is taken. Such selection and positioning occur at run time, when the chart components are applied based on these attributes. The CRL specification can be applied without prior knowledge of the entire set of charts that is specified, and without explicit association of the components with the chart which results in redundant effort when chart requirements change. In addition, making copies of components for a new chart is not necessary. However, it is noted that in other methods such copies are in fact necessary.

For example, a set of charts might have a requirement to place data in certain columns under certain conditions. To handle this requirement, the CRL user describes those conditions at a high level and specifies which data goes into which column. When those conditions are true or met, the data is placed into those columns at the time the chart produced. Other requirements might be for a particular chart note or label to be present on one chart and another chart note or label to be present on a different set of charts. One entry in a Table is needed to describe the conditions under which the first note applies along with its attributes and another entry for the second note and its attributes. These are more particularly illustrated in Tables 1 through 5 below.

The major advantage of the pattern matching system used in the CRL is the ability to generically define and manage individual components in chart and chart structures for groups of charts at a time. Conditions under which a chart or group of charts exist are described more particularly below. Afterwards, the component or structures description is applied for any chart that meets those conditions.

To illustrate the benefits of the CRL, the case of a certain project office that has five types of charts for twenty customers is considered. In this example, 100 charts are produced. These 100 charts might have two lines of title on each which would normally translate into 200 chart notes to input and maintain if something is changed in the future. In might be determined for example that the first title lines should apply to customer and the second to the "chart type". With the CRL, this requirement can be reduced to twenty entries (one for each customer name) plus five entries (one for each chart type). This represents an 87.5% improvement in chart title maintenance time and effort. The same kinds of efficiency are realized in all other aspects of chart maintenance as described herein. While the specific percentage improvements may vary, the effective increases in efficiency are still nonetheless produced.

The best approach to understanding the present invention, is to understand the structure and content of three user specifiable lists. While these lists are characterized herein as being user supplied, it should be appreciated that some of the specification may have been provided ahead of time by other users or information requestors or information measurement generators. These lists are described in Tables 1 through 3 provided below. The first Table describes the GDS list. The second Table describes the component list. The third Table describes the indicia list. The contents of these lists and their role in producing the resulting graphical structure is now considered.

TABLE 1

GDS List

| GDS Description | GDS Attributes |
|---|---|
| SURVEY91,Rice | STACKBAR,SendTo-Rice |
| SURVEY91,Eubanks | STACKBAR,SendTo-Eubanks |

TABLE 2

Component List

| GDS Description | Component Description | Relative Position Indicia (and Label) |
|---|---|---|
| SURVEY*,* | (ThisMonth-3),Actual,* | X1,(ThisMonth-3) |
| SURVEY*,Rice | (ThisMonth),Actual,* | X2,"ThisMonth" |
| SURVEY*,Eubanks | (ThisMonth),Actual,* | X2,(ThisMonth) |
| *91,* | (Latest),Target,* | X3,"Target" |
| SURVEY91,* | *,*,Question-1 | Y1,"Question-1" |
| SURVEY91,* | *,*,Question-2 | Y2,"Question-2" |

Note: (this month) is "December"

TABLE 3

Indicia List

| GDS Description | Component Description | Magnitude Value |
|---|---|---|
| SURVEY91,* | December,Target,Question-3 | 7.2 |
| SURVEY91,* | December,Target,Question-1 | 2.0 |
| SURVEY91,Rice | December,Actual,Question-2 | 8.3 |
| SURVEY91,Rice | December,Actual,Question-1 | 4.2 |
| SURVEY91,Rice | September,Actual,Question-1 | 5.1 |
| SURVEY91,Eubanks | September,Actual,Question-1 | 4.3 |
| SURVEY91,Eubanks | December,Actual,Question-1 | 4.1 |

Figure 2:
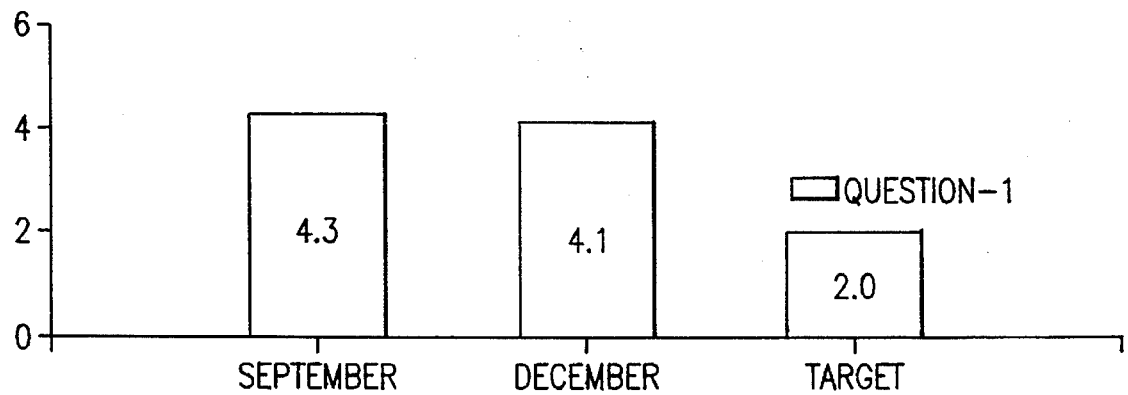
FIG. 2 is a chart similar to FIG. 1 which is also specifiable automatically from the same base of data used in the construction of the graph in FIG. 1.

The GDS list contains two fields: a GDS description field and a GDS attribute field. A graphical data structure results from each row in Table 1. In particular, the present example shows 2 rows and there are correspondingly 2 graphical data structures produced; these are shown in FIGS. 1 and 2. Typically, higher level end user interaction is more usually present in the GDS component list. In particular, it is noted that with respect to the GDS attribute field there are in fact two subfield entries indicated. In general, the preferred implementation of the present invention employs an arbitrary number of subfields. However in the present case, it is seen that the GDS attribute field indicates that both of the graphical data structures produce the graphical elements which are bars or boxes and that they are displayed in a mode in which one box is stacked upon another. Side by side or overlapped grouping of bars is also possible. It is also seen that this particular field offers the user the opportunity to specify the name of an individual to whom the resultant graphical data structure can be (electronically) sent for display on a screen or for printing on a plotter or other form of hard copy output device.

For ease of understanding the entries in the tables presented below, it should be appreciated that the particular business graphic charts that are produced in accordance with the present invention represent employee survey information for employees reporting to different managers (Rice and Eubanks). The fictitious survey results are reported for several different questions and for different time periods spaced apart by (in this case) three months. Additionally, distinctions are made between actual survey results as opposed to targeted desired results. The magnitude values represent average values for questions for which a response could be indicated as a numeric value of one through ten wherein a value of one might indicate strong agreement and a value of ten might for example indicate strong disagreement.

Attention is now focused on the structure of the COMPONENT LIST which includes three fields: the GDS description, the component description and a third field indicating (relative) position indicia. Furthermore, in the particular case at hand, label information is also supplied in this third field. It is to be particularly noted that the component list Table contains field entries containing asterisks. The asterisk represents a wild card and is employed as part of a template mechanism for selecting GDS elements to be assembled into various graphical data structures (charts in this example).

Specific consideration is now directed to the effect produced by various elements contained in the fields shown in Table 2. In particular, the first entry in Table 2 is now considered. In the first row and first column, the entry "SURVEY*,*" in the GDS description field indicates that this entry is applicable to all graphical data structures whose first six characters are described by the letters "SURVEY". Additionally, this entry is applicable to any of the specific managers selected from the GDS description portion of the GDS list shown in Table 1 (here for example, Rice and/or Eubanks). With respect to the component description portion of the component list shown in Table 2 (first row, second column), the first entry "(ThisMonth-3)" indicates (via the parentheses) a call to a date function. This function accesses computer installation date information to determine what the actual current month is at run time and references a point in time three months earlier as a result of the "-3" portion of the entry. Note how this is distinguished from the literal expression for "This Month" shown in column 3, row 2 of Table 2. In the implementation of the present invention either of these forms are permitted to produce graphical data structures for data from various months and to provide appropriate labels therefor. The next entry in the component description portion of the component list in Table 2 contains the value "Actual". This field is used in comparisons with entries from the indicia list in Table 3. In particular, the present chart description contains a distinction between data which is actual and data which represents a desired target. It would be just as easy to provide entries in the indicia list and in the component list reflecting past values simply by entering descriptions in the various lists. In general, the component description can provide an arbitrary number of different selection criteria subfields. For example, in the present example another distinguishing variable might include the fact as to whether or not the data resulted from Question 1, Question 2 or Question 3 on a survey sheet. The asterisk in the third subfield from column 2, row 1 of the Table 2 component list is an asterisk and denotes wild card selection. Thus the relative position indicia described by this row is applicable to Question 1, Question 2 or Question 3 from the survey results.

The third column in Table 2 (the component list table) provides an indication of the position of a GDS element such as a vertical bar, horizontal bar, pie chart section or other graphical element. For the chart representation example, the position indicia is actually best represented in terms of a relative position, as opposed to specifying absolute coordinates. However, this would also be possible merely by changing the meaning associated with the first field entry. In particular, for the entry in the first row, third column of the component list, the first subfield entry "X1" indicates that for matches which are found based upon component description criteria the result is to be displayed in the first horizontally available position for the stack bar. The second subfield entry provides a label for this horizontal position along the X axis. The label that is to be attached is the name of the current month. The parenthesis around "ThisMonth" indicates a reference to an operating system data function which returns the value of the current month at run time. This is to be compared with the entry in column 3, and line 2 of Table 2 wherein a literally specified label is assigned to the first horizontal position. Likewise, in rows 5 and 6 of Table 2 column 3 provides an indication that the lower most vertical position (Y1) is dedicated to responses relating to Question 1 with the next uppermost position being related to Question 2. In this regard however note that the entry in column 2 of Table 2, rows 5 and 6 are the entries which really control the selection of questions 1 and 2 as part of the matching criteria. In contrast, the "Question-1" and "Question-2" indicators in the third column of rows 5 and 6 of Table 2 are merely literal labels and for example could just as easily have been indicated as "Question-#1" or "Question-#2". It is noted that with respect to Table 1, the assumption is that the current month is December and that the functional reference via the enclosed entry "ThisMonth" actually returns the December value. This assumption is applicable to the graphical data structures produced in accordance with the present invention and which are more particularly described below and shown in FIGS. 1 and 2.

Attention is next directed to the INDICIA LIST shown in Table 3. The indicia list also has three component fields, a GDS description field, a component description field and a magnitude value field. It is this latter field which controls the size of graphical data elements. For example, in the second row of the indicia list table the implication is that for all SURVEY91 charts the targeted value for Question 1 is 2.0. The first row in the table indicates that the target for Question-3 is 7.2. It is thus clear that the indicia list not only provides the magnitude value for the graphical data elements to be displayed but also specifies other parameter fields such as month, target versus actual or question number. It is this component description used in conjunction with the component descriptions in GDS descriptions from Tables 1 and 2 that are used to select the appropriate magnitude values and for each magnitude value that is selected, there is at least one corresponding relative position. Thus in a certain sense Table 3 represents collected data. In another sense, Table 3 represents different flexible arrangements of this data not in terms of number or magnitude per se but in terms of the sizes and relative sizes (from Table 3) and relative positions of various graphical data structures which are employed to represent the data. In essence then, the specifications of chart structure may be supplied by the user through the construction of a component list (Table 2). Typically, the data for the chart is already collected and stored by the time that a user seeks to generate charts via Table 2 descriptions.

With respect to the specific entries shown in the example in Tables 1, 2 and 3, it is seen that the following are common between the two graphic data structures and therefore apply to both of the structures called for in Table 1: the September component on the X axis, the target component, the Question 1 component and the Question 1 target indicia. It is also seen that the following items were not selected: Question 3 indicia (since there were no component matches) and Question 2 for the manager Eubanks (since the component element matches, but there is no indicia). It should therefore be appreciated that much of the present invention can be understood from an examination of the three tables.

As a result of the first line in Table 1 which specifies an assemblage of graphical data structure elements as being part of an overall graphical data structure, the structure that is shown in FIG. 1 results. In the generation of FIG. 1, intermediate GDS data for the "SURVEY91,Rice" description is generated as is shown in Table 4 below.

TABLE 4

| Intermediate GDS Data (For the "SURVEY91,Rice" Description) | |
|---|---|
| Relative Position Indicia (and Label) | Magnitude Value |
| X1,September,Y1,Question-1 | 5.1 |
| X2,This Month,Y1,Question-1 | 4.2 |
| X2,This Month,Y2,Question-2 | 8.3 |
| X3,Target,Y1,Question-1 | 2.0 |

Likewise, for the second entry in the GDS list of Table 1 the entry "SURVEY 91, Eubanks" results in the structure shown in FIG. 2. The generation of this latter structure results in an intermediate GDS data structure being generated. This latter structure is shown in Table 5 below. The resultant graphical data structure for this second entry in Table 1 is shown in FIG. 2. Clearly the Tables 4 and 5 represent a combination of selected relative position, magnitude and label information which is to be displayed or to be produced in hard copy form.

TABLE 5

| Intermediate GDS Data (For the "SURVEY91,Eubanks" Description) | |
|---|---|
| Relative Position Indicia (and Label) | Magnitude Value |
| X1,September,Y1,Question-1 | 4.3 |
| X2,December,Y1,Question-1 | 4.1 |
| X3,Target,Y1,Question-1 | 2.0 |

One of the reasons for the applicability of the present method to the generation of business graphics data structures, is seen to be the fact that it is not necessary to produce overlapped graphical element and any overlap that might exist is transparent to the user. However, it should be noted that it would be very easy to add an attribute to the relative position indicia field in order to indicate a visibility layer attribute. Thus an entry which is selected, say from layer 1, might in fact be overlayable by structures from layer 2 or layer 3. This is a common feature and technique employed in such graphical data description languages as for example, Postscript™, (owned by Adobe Systems, Inc.). While the particular data structure elements in the present application are generated using GDF (a common data format supplied by the assignee of the present invention), it is noted that it is also possible to employ other formats such as Postscript™.

It is also noted that from the descriptions found in Tables 1, 2 and 3 above that the following parts are in common and do not require duplicative maintenance. This includes the "September" part on the X axis which is "backward 3 months", the target part on the X axis, the Question 1 part and the Question 1 target date of value parts. The following entries were not used but are available for future use: the Question 3 data value (a Question not selected by a part) and the Question 2 part of Eubanks (which was selected but not available).

In order to appreciate the operation of the present invention an understanding of the relative roles of the lists shown in Tables 1 through 3 is important. Furthermore, the following general rule is applicable. In particular, a value is included on a chart if it (1) has a chart to which it belongs, (2) has an X and Y axis position/label, (3) has a data group position/label, and (4) is not null. These simple rules determine the ultimate graphic data structure that results.

Additional aspects of the selection method include the fact that templates refer to fields that may or may not contain wild cards or masks each of which may contain any single character or multiple characters. Additionally, when comparing descriptions, such wild cards are taken into account, thereby enabling many-to-many relationships with a minimum number of elements in each list. Component description values may contain parameters to be resolved when a comparison is performed. A label may or may not be associated with relative position indicia in the component list, and, the construction of the graphical data structure for magnitude and relative position indicia with the set of GDS attributes may or may not mean, for purposes of the present invention and preferred means for practicing the present invention, that the GDS attributes necessarily contain pointers to exits, subroutines or existing software to interpret the indicia.

Figure 3:
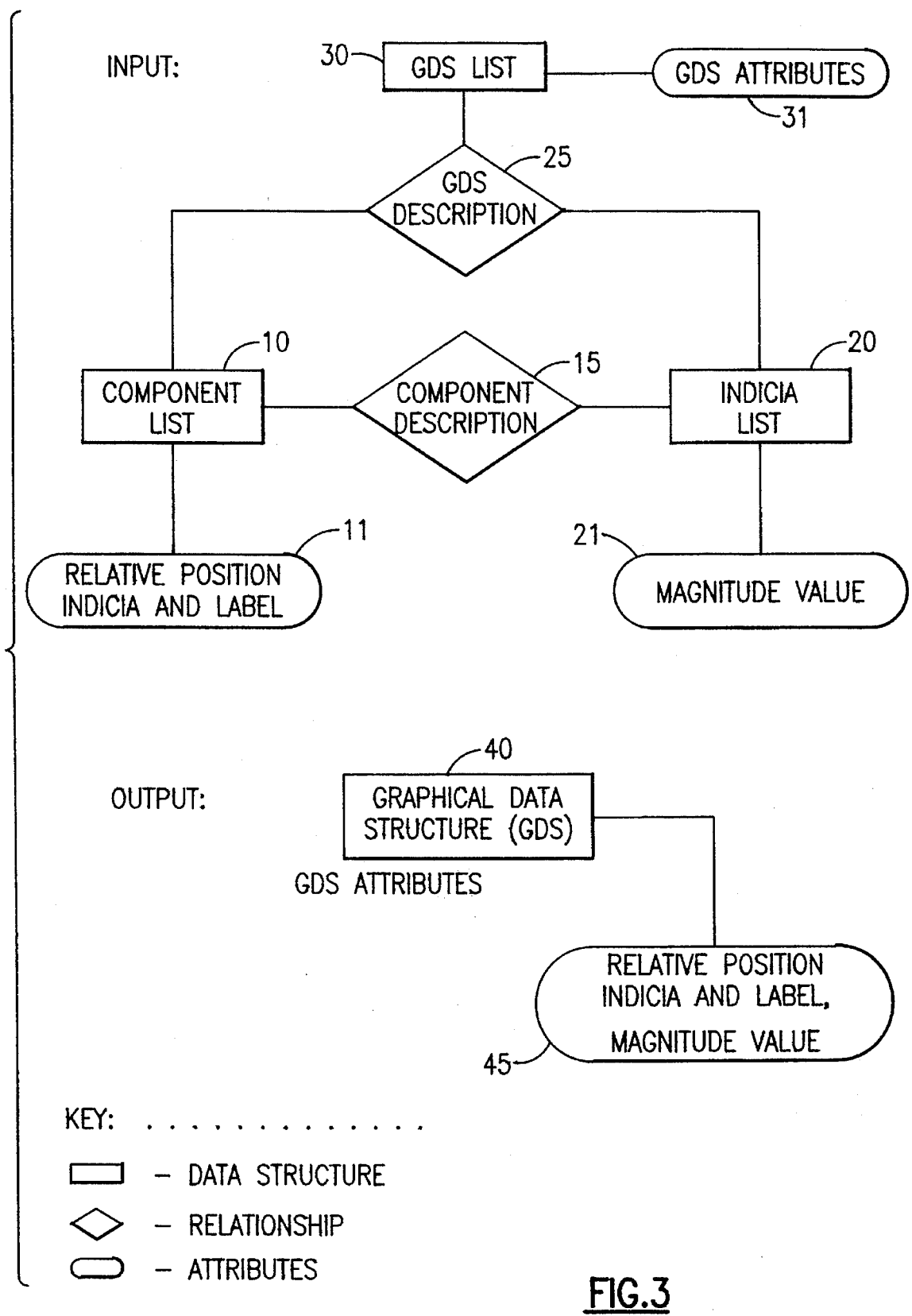
FIG. 3 is a block diagram representing the relationship between the various data structures used in constructing the present invention, this block diagram being represented in a form which is typically employed in the description of relational data bases.

The input and output supplied to a program embodying the present invention is shown in FIG. 3. In particular, in accordance with one embodiment of the present invention three user supplied lists are employed: namely, component list 10, indicia list 20 and GDS list 30. In particular, an attribute of component list 10 is the position indicia and label 11. This list is reflected in Table 2. Additionally, magnitude value 21 is associated with indicia list 20. Component description block 15 indicates that there is a relation that exists between component list and indicia list entries. The last input item is supplied by a user is GDS list 30 which includes GDS attributes 31. Based upon relationships that exist and which are indicated by the component description relationship 15, the GDS description 25 is employed to create an overall assemblage of position and value modulated graphical elements. In particular, this is illustrated by output block 40 which includes (relative) position indicia label and magnitude value attributes. This is illustrated in block 45 which may be compared with Tables 3 or 4 discussed above.

Figure 4:
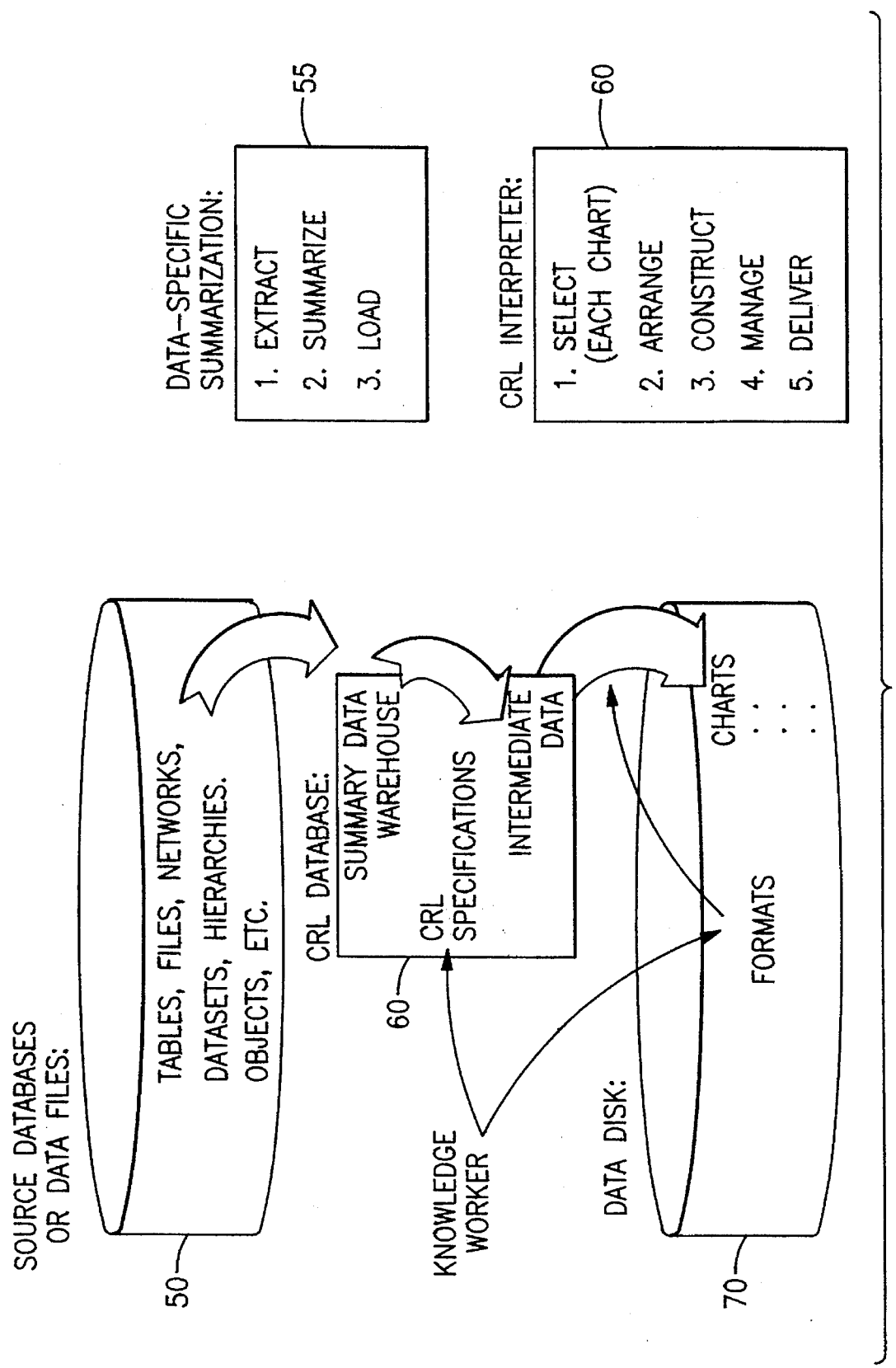
FIG. 4 is a block diagram illustrating the flow of information before and during the practice of the present invention.

The role of the user of the present invention is particularly illustrated in FIG. 4 which also illustrates the utilization of the chart representation language (CRL) as a mechanism for processing data from disk file 50 through the CRL interpreter 60 to produce intermediate data files which may be transferred to disk file 70 and which is ultimately made to produce graphic images. More specifically, it is possible to employ the present invention in conjunction with a preprocessor which performs a data specific summarization of various forms of information present in disk file 50 and transforms it into a form suitable for processing by the present invention. Likewise, the CRL interpreter itself is capable of processing summary data warehouse information and operating on it to produce intermediate data such as is illustrated in Tables 4 and 5. From thence there is generally a one-to-one correspondence between selected GDS elements and rows of the intermediate tables. These may be readily processed to generate either screen or hard copy images of selected information based on easily supplied user selectable criteria.

From the above, it should be appreciated that the method of the present invention provides a system for the management and rapid production of a number of automated business graphics charts. It should also be appreciated that the present invention is not limited to the production of business graphic charts but may be extended to any operation in which graphical data elements may be assembled on a conditional basis using information contained in a data base concerning the size and positioning of selectable elements. It should also be appreciated that the present invention has in effect provided a chart representation language capability which makes the quick and accurate generation of business graphic charts from large masses of data very easy to generate and disseminate. It makes it possible to assemble and to display large pieces of information in a user selectable and user meaningful fashion. Accordingly, it should be appreciated that the present invention has in fact devised an effective and easily useable system for converting large amounts of data into human readable information formats.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

I claim:

1. A method for operating a computer system to generate multiple-component graphical data structures, said method comprising the steps of:

specifying within said computer system at least one graphical data structure description, and a corresponding set of at least one graphical data structure attributes associated with said graphical data structure description, thus establishing a graphical data structure list;

specifying within said computer system at least one graphical data structure description template which is associated with a corresponding component description template and which is further associated with a corresponding relative position indicium, thus establishing a component list;

specifying within said computer system at least one graphical data structure description template which is associated with a component description template and which is further associated with a corresponding magnitude value, thus establishing an indicia list; and for at least one entry in said graphical data structure list, generating within said computer system a graphical data structure which includes a graphical element whose size is determined by at least one of said magnitude values as specified in said indicia list, and whose position is determined by relative position indicia from said component list, said graphical data structure being constructed from said set of graphical data structure attributes for combinations of matches between a graphical data structure description from the graphical data structure list and graphical data structure description templates from the component and indicia lists, and matches between component description templates from the component and indicia lists.

2. The method of claim 1 further including the step of producing an image from said generated graphical data structure.

3. The method of claim 1 in which said graphical data structure components include label information.

4. The method of claim 1 in which said graphical data structure components are created using a template based chart representation means.

5. The method of claim 1 in which said position specified is a relative position.

6. The method of claim 1 in which said method includes the step of supplying horizontal or vertical axes to said graphical data structure.

7. A method for operating a computer system to generate multiple component pictorial graphical data structures, said method comprising the step of generating at least one pictorial graphical data structure from a plurality of graphical data structure components whose descriptions are contained in a component list having relative position indicia and in an indicia list having magnitude values wherein size and position of said components in said graphical data structure are determined from said magnitude values and said relative position indicia respectively by comparing pairs of graphical data structure component descriptions contained in said lists and by matching patterns between said lists so as to indicate which graphical data structure components to select for inclusion in said pictorial graphical data structure.

8. The method of claim 7 in which said graphical data structures represent charts.

9. The method of claim 8 in which said charts are selected from the group consisting of bar charts and pie charts.

* * * * *